United States Patent [19]
Rudd et al.

[11] Patent Number: 5,375,453
[45] Date of Patent: Dec. 27, 1994

[54] ASSEMBLY FOR EVALUATING GASKET SERVICE LIFE AND METHOD FOR PERFORMING THE SAME

[75] Inventors: George E. Rudd, Murrysville; Rajender K. Sadhir, Plum Boro; Samuel A. Withrow, Ligonier Township, Westmoreland County; Dong S. Kim, Penn Hills, all of Pa.; Daniel L. Price, Bloomington, Minn.

[73] Assignee: Westinghouse Electric Corporation, Pittsburgh, Pa.

[21] Appl. No.: 114,727

[22] Filed: Aug. 31, 1993

[51] Int. Cl.$^5$ ............... G01M 3/04; G01N 3/12
[52] U.S. Cl. ............... 73/37; 73/49.8; 73/40.7; 73/807; 73/866; 73/865.6; 374/47
[58] Field of Search ............ 73/37, 46, 49.8, 40.7, 73/797, 807, 808, 865.60, 866; 374/47

[56] References Cited

U.S. PATENT DOCUMENTS

| | | | |
|---|---|---|---|
| 3,400,572 | 9/1968 | Mizenko | 73/37 |
| 3,895,735 | 7/1975 | Clay | 220/5 A |
| 4,064,745 | 12/1977 | Gaddum | 73/91 |
| 4,090,401 | 5/1978 | Yamamoto et al. | 73/91 |
| 4,765,810 | 8/1988 | Wetzel | 55/270 |
| 4,888,979 | 12/1989 | Steeper | 73/40.7 |
| 4,918,968 | 4/1990 | Hoffman | 73/37 |
| 5,182,076 | 1/1993 | de Seroux et al. | 73/37 |
| 5,287,727 | 2/1994 | Nickerson, Jr. | 73/37 |
| 5,287,749 | 2/1994 | Nakamura | 73/808 |

FOREIGN PATENT DOCUMENTS

| | | | |
|---|---|---|---|
| 286313 | 11/1970 | U.S.S.R. | 374/47 |
| 288376 | 12/1970 | U.S.S.R. | 374/47 |

OTHER PUBLICATIONS

U.S. Patent Application 07/668,838, "A Method For Determining The Amount Of Deformation Induced In A Material By A Compressive Force".

Brochure entitled "Leak Detector RXS 200", Balzers.

ASTM Designation: F36-88, "Standard Test Method For Compressibility And Recovery Of Gasket Materials".

ASTM Designation: F37-89, "Standard Test Methods For Sealability Of Gasket Materials".

ASTM Designation: F38-88, "Standard Test Methods For Creep Relaxation Of A Gasket Material".

ASTM Designation: F152-87, "Standard Test Methods For Tension Testing Of Nonmetallic Gasket Materials".

ASTM Designation: F586-79, "Standard Test Method For Leak Rates Versus y Stresses and m Factors For Gaskets".

*Primary Examiner*—Thomas P. Noland
*Assistant Examiner*—J. David Wiggins
*Attorney, Agent, or Firm*—Gary R. Jarosik

[57] ABSTRACT

A method and apparatus for approximating the life of a gasket used in a predetermined environment is provided which allows for the long-term exposure to the environment to be simulated over a shortened period of time. The method and apparatus utilize the steps of placing a gasket sample in a test assembly, clamping the gasket sample within the test assembly at a predetermined clamping pressure whereby a chamber is formed within the interior of the gasket sample, filling the chamber with a gas at a predetermined pressure from a gas fill system, changing the temperature of the gasket sample over a predetermined number of temperature cycles, and measuring the amount of the gas which leaks from the chamber. The apparatus may also include a pressure control system for changing the pressure within the chamber over a predetermined number of pressure cycles or in response to predetermined temperature conditions.

26 Claims, 2 Drawing Sheets

ASSEMBLY FOR EVALUATING GASKET SERVICE LIFE AND METHOD FOR PERFORMING THE SAME

BACKGROUND OF THE INVENTION

This invention relates generally to test fixtures and methods of evaluating gaskets, O-rings, and other sealing devices and, more particularly, relates to a static test fixture and method of evaluating gasket leakage under accelerated, simulated, service conditions for the purpose of predicting service life.

Gaskets are used in a variety of industrial and consumer products to provide seals between mating assemblies. Examples of such products include internal combustion engines, piston-type compressors, and steam turbines. Depending upon the application, gaskets are subjected to a wide range of temperatures and pressures in which these conditions, along with the chemical nature of the pressurizing medium (such as air, water, steam, refrigerant, etc.), are significant factors in selecting the appropriate material from which to construct the gasket. In order to facilitate the decision associated with selecting the appropriate gasket material for the desired application, gasket test assemblies are utilized to measure specific mechanical properties of gasket samples which information is useful in aiding the selection of the correct gasket for the particular application.

Typical gasket test assemblies used to test the sealing characteristics of gaskets are of two varieties. The first gasket test assembly comprises a static test fixture which is used to check gasket performance under static conditions where neither surface in contact with the gasket is allowed to move. The second gasket test assembly comprises a dynamic test fixture which is used to check gasket performance under dynamic conditions where at least one of the surfaces in contact with the gasket is allowed to move with respect to the gasket during operation. These typical test assemblies are useful in measuring the mechanical properties of the tested gaskets which in turn allows gasket behavior to be quantified to a certain measured degree. While the test results gathered from these assemblies provide insight as to the mechanical properties of the gaskets subjected to the testing procedure, the assemblies and corresponding test results have the disadvantage of not being generally useful for predicting the service life of the tested gasket.

It is therefore an object of the present invention to provide an apparatus and method for testing gasket specimens under simulated service conditions whereby the service life of the gasket may be predicted.

It is a further object of the present invention to provide an apparatus and method whereby the cycles of temperature and pressure which occur in service may be accelerated for reducing the time required in evaluating gasket candidates.

SUMMARY OF THE INVENTION

In accordance with the present invention, a method of approximating service life of a gasket in a predetermined environment is provided. The method consists of the steps of placing a gasket sample in a test assembly, clamping the gasket sample within the test assembly at a predetermined clamping pressure whereby a chamber is formed within the interior of the gasket sample, filling the chamber with a gas at a predetermined pressure from a gas fill system, changing the temperature of the gasket sample over a predetermined number of temperature cycles wherein the temperature cycle has a maximum and minimum temperature and a predetermined temperature cycle time period, changing the pressure within the chamber over a predetermined number of pressure cycles wherein the pressure cycle has a maximum and minimum pressure and a predetermined pressure cycle time period, and measuring the amount of the gas which leaks from the chamber as well as the gasket load changes occurring during temperature and pressure cycling.

For use in conjunction with the above-described method, and in accordance with the present invention, a test assembly for approximating service life of a gasket in a predetermined environment is also provided. The test assembly consists of a base assembly and load cell adapted to accept a gasket sample, sealing or clamping means associated with the test assembly for securing the gasket sample within the test assembly and thereby creating a chamber within the interior of the gasket sample, filling means connected to the test assembly for filling the chamber with a gas at a predetermined pressure, temperature control means associated with the test assembly for changing the temperature of the gasket over a predetermined number of temperature cycles wherein the temperature cycle has a maximum and minimum temperature and a predetermined temperature cycle time period, pressure control means associated with the test assembly for changing the pressure within the chamber over a predetermined number of pressure cycles wherein the pressure cycle has a maximum and minimum pressure and a predetermined pressure cycle time period, measuring means connected to the test assembly for measuring the amount of the gas which leaks from the chamber and means to measure the gasket load changes during cycling.

A better understanding of the objects, advantages, features, properties and relationships of the invention will be obtained from the following detailed description and accompanying drawings which set forth an illustrative embodiment and is indicative of the various ways in which the principles of the invention may be employed.

BRIEF DESCRIPTION OF THE DRAWINGS

For a better understanding of the invention, reference may be had to the preferred embodiment shown in the following drawings in which.

DETAILED DESCRIPTION

While the invention may be used for evaluating various sealing devices under various conditions, the invention will be described hereinafter in the context of a static test assembly for evaluating flat gaskets as the preferred embodiment thereof.

Figure 1:
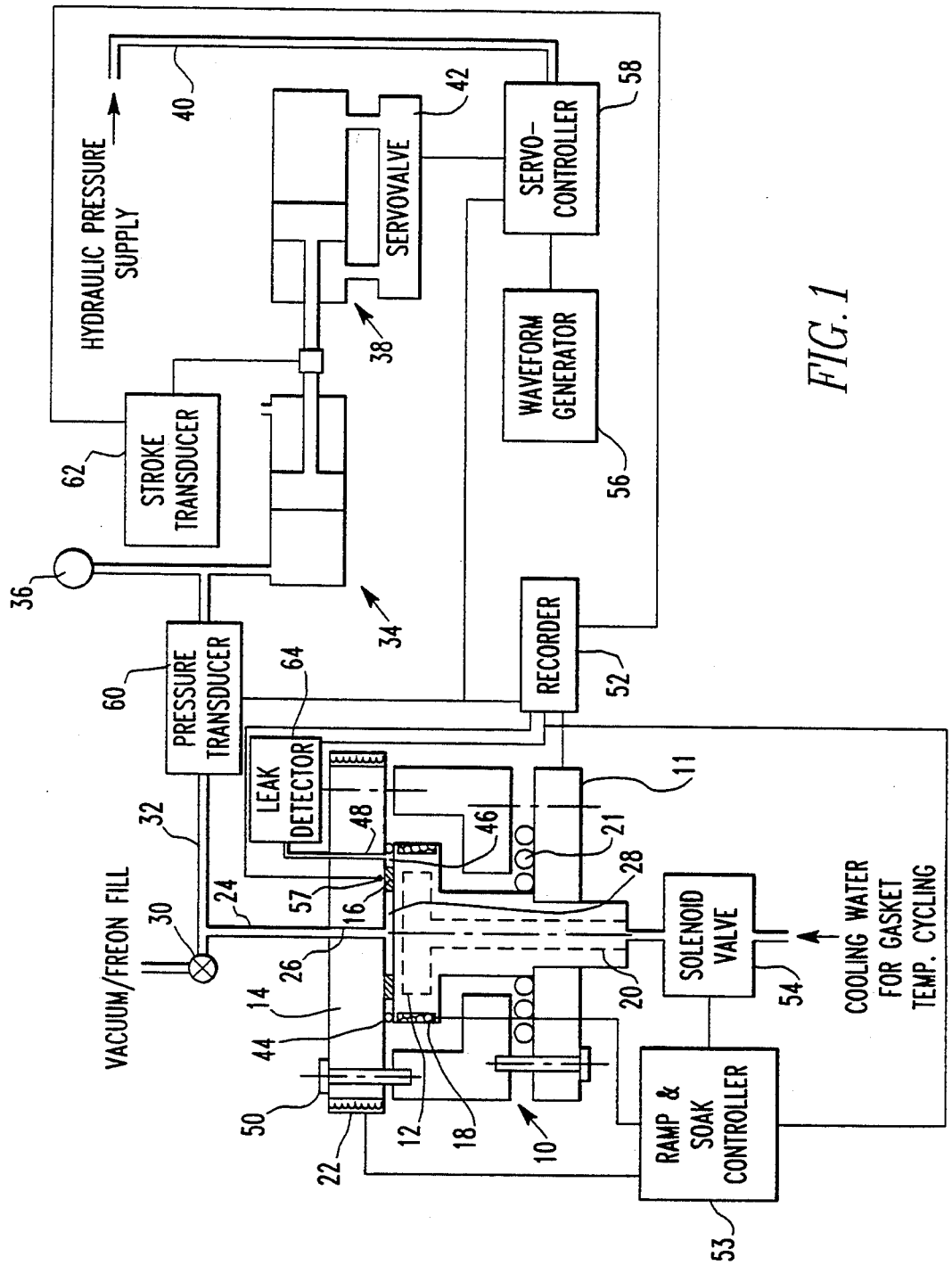
FIG. 1 shows a schematic diagram of the test assembly in accordance with the present invention.

A schematic diagram, in accordance with the present invention, is shown in FIG. 1 including a static test assembly (10) to which various recordation devices, to be discussed hereinafter, are attached. The test assembly (10) includes a load cell (11), base assembly (12) and sealing assembly (14), constructed substantially of aluminum, between which a flat gasket sample (16) is disposed. Included in the base assembly (12) are heaters (18) and a water cooling system (20) whose purpose is to cool test assembly (10). The cooling system also has cooling coils (21) whose purpose is to cool the load cell (11). Included in the sealing assembly (14) are heaters (22). The heaters (18,22) and the cooling system (20) are used in controlling the gasket temperature during the temperature test cycling to be discussed hereinafter. Within the test assembly (10) and positioned in proximity to and substantially concentrically with gasket sample (16) is an O-ring (44) which is used to confine any leakage from the gasket sample (16) which may occur during the test procedure to be discussed hereinafter. The gasket sample (16) and O-ring (44) create an annular chamber (46) which is accessible from the exterior of the test assembly (10) via channel (48).

Connected to the test assembly (10) is gas fill line (24) such that the gas fill line (24) is connected to opening (26) in the sealing assembly (14). The opening (26) leads to chamber (28) formed by the inner diameter of the gasket sample (16) as the gasket sample (16) is secured between the surfaces of the base assembly (12) and the sealing assembly (14). The gas fill line (24) is connected to a gas source (not shown) through valve (30). Further connected to the gas source and gas fill line (24), via gas line (32), is piston assembly (34). The piston assembly (34) is equipped with a pressure gauge (36) for providing the operator with a visual indication of the pressure in the gas fill and pressurizing system. Piston assembly (34) is controlled via piston assembly (38) which is connected to a hydraulic pressure supply (not shown) through line (40) and servo-valve (42).

The gasket sample (16) which is secured between the base assembly (12) and sealing assembly (14) is typically a flat, ring shaped, single thickness of the gasket material to be tested dimensioned to approximately 3.4 inches in outside diameter and 3.0 inches in inside diameter. Before the gasket sample (16) is placed between the mounting and sealing surfaces within the load cell (10), a small amount of lubricant is placed thereon to moisten the specimen. An example of a typical lubricant is Zerol-150 refrigeration oil. Once the gasket sample (16) is disposed within the test assembly (10), a clamping force is applied through tightening of clamping bolts (50). Typically a torque wrench is utilized during this procedure to ensure uniform loading on the gasket sample (16). It is desired to place the gasket sample (16) under approximately 3500-4000 psi of clamping pressure as a result of the initial clamping. The clamping load applied to the gasket sample (16) may be measured by a load or other pressure sensitive device cell (11) located in test assembly (10) which measurements may be recorded by connection to recording device (52). The pressure placed upon the gasket sample (16) is a function of the environment which is to be simulated and other clamping pressures are contemplated.

Once the gasket sample (16) has been secured within the test assembly (10), the test system is initially charged by first pulling a vacuum in the gas fill system which includes chamber (28), gas fill line (24), line (32), and piston assembly (34) through the use of a vacuum (not shown) connected to the system via valve (30). After the vacuum has been established in the gas fill system, the system is back-filled via valve (30) with the gas which is to be utilized in the test procedure. In the preferred embodiment, the system is filled with Freon R-22, although other gases are contemplated depending upon the system to be simulated. It has been found that the Freon back-fill procedure is aided by chilling the piston assembly (34) with blocks of dry ice which ensures that the piston assembly (34) contains both liquid and gaseous Freon. As testing progresses, it is seen that a portion of the liquid Freon, which results from the chilling procedure applied to piston assembly (34), vaporizes to replace any gaseous Freon which may leak from the system, thereby maintaining an adequate supply of gas in piston (34).

The testing procedure consists of cycling the temperature of the test assembly (10) including base assembly (12) and sealing assembly (14), and hence the gasket sample (16), as well as cycling the pressure of the gas within the chamber (28) formed by the interior of the gasket sample (16). The temperature cycle is controlled by a programmable temperature controller (53) connected to the electrical heaters (18,22) and a solenoid valve (54) in water cooling circuit (20). Temperature sensors positioned within the test assembly (10), such as thermocouple (57), are used as feedback to the temperature controller (53). The pressure cycle is controlled by varying the compression applied to the gas by piston assembly (34) which is in turn controlled by piston assembly (38) by being linked thereto. Piston assembly (38) is driven by a hydraulic actuator comprising a programmable waveform generator (56) which provides a control signal to a servo-controller (58) which is in turn connected to servo-valve (42). The servo-valve (42) controls the flow from the hydraulic pressure supply which is in turn connected to piston assembly (38) via line (40). The hydraulic pressure, controlled by servo-valve (42), functions to control the stroke of the piston assembly (38) and thereby, the stroke of piston assembly (34) wherein the pressure within chamber (28) may be altered. A pressure transducer (60) attached to gas line (32) is used for feedback to the hydraulic system. It is noted that piston (34) may also be driven by a motor-driven screw jack, pneumatic piston or the like.

Figure 2A:
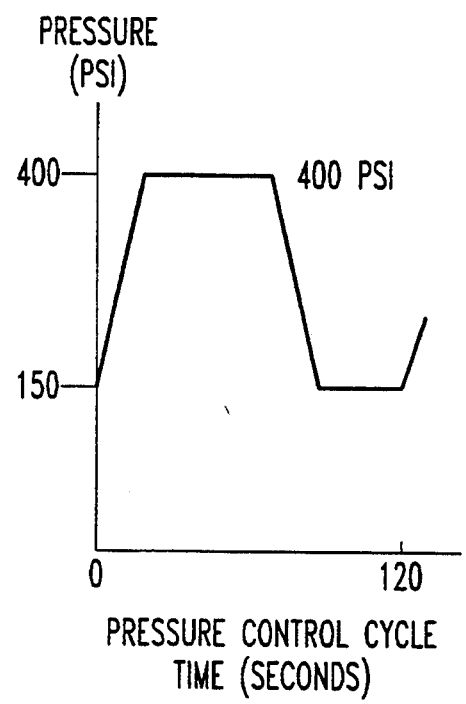
FIG. 2A shows a graphical representation of the pressure control cycle utilized in the present invention.
Figure 2B:
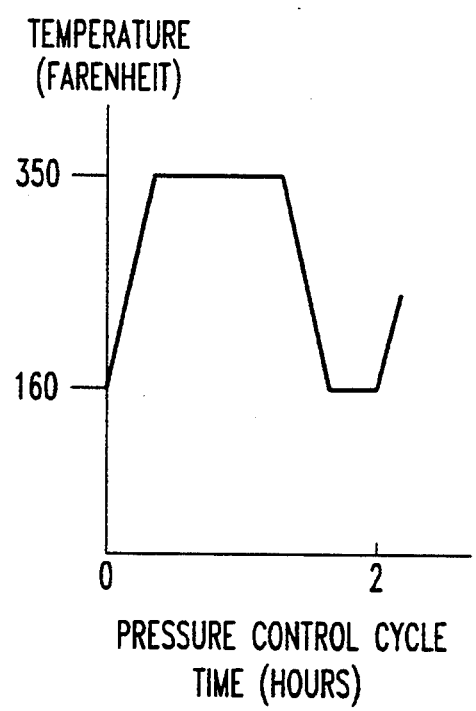
FIG. 2B shows a graphical representation of the temperature control cycle utilized in the present invention.

The temperature and pressure cycles are continuously cycled during the test, usually at differing frequencies. FIG. 2A is a graphical representation of a typical pressure control cycle for use in the preferred embodiment in which the horizontal axis represents time in seconds and the vertical axis represents pressure within the chamber (28) in psi. The pressure in the representative cycle is cycled in approximately 2 minute intervals between a minimum pressure of approximately 150 psi and a maximum pressure of approximately 400 psi. The transition between the minimum pressure and the maximum pressure is to be accomplished in approximately 5 seconds and the maximum pressure is to be maintained for approximately 100 seconds. FIG. 2B is a graphical representation of a typical temperature control cycle for use in the preferred embodiment in which the horizontal axis represents time in hours and the vertical axis represents the temperature in degrees Fahrenheit of the gasket sample (16) and the chamber (28). The temperature in the representative cycle is cycled over approximately 2 hours between an approximate minimum temperature of 160° F. and an approximate maximum temperature of 350° F. The transition between the minimum temperature and the maximum temperature is to be accomplished in approximately 20 minutes and the maximum temperature is to be maintained for approximately 1 hour. In the preferred embodiment, a full test consists of approximately 5700 pressure cycles or 95 temperature cycles. The pressure and temperature ranges of the simulation cycles in the preferred embodiment are modeled after the conditions found in a typical compressor used in refrigeration which is the environment in which the gaskets will be used. Other test cycles of varying temperature, pressure, and time are contemplated depending upon the particular environment to be simulated.

In an alternative embodiment of the invention, a control option is added to the hydraulic system whereby the gas pressure may be cycled continuously, as described above, or held at a predetermined pressure depending upon the gasket temperature. In this embodiment, the waveform generator (56) is linked to the ramp and soak controller (53) so that the temperature may be monitored. In this embodiment, where again Freon R-22 is utilized as the pressurizing gas, a hold pressure of approximately 150 psi will be implemented after the gasket temperature drops to approximately 310° F., from a maximum of approximately 350° F., and pressure cycling will not resume until the gasket temperature rises to approximately 170° F. during the heat up portion of the next cycle. This embodiment allows simulation of a compressor during restart from a "cold" condition resulting from shutdown. Again variations of hold pressures, temperatures and timing of the respective cycles are contemplated depending upon the particular characteristics of the system to be simulated.

The gasket test assembly may be equipped with a recordation device (52) which is used to provide a hard record of the conditions associated with the test procedure. Specifically, the recordation device (52) may be linked to temperature monitoring devices within the test assembly (10), such as thermocouple (57), pressure transducer (60), or clamping pressure measuring devices in test fixture (10) whereby gasket temperature, chamber (28) pressure, or clamping force may be recorded. Furthermore, recordation device (52) may be attached to a stroke transducer (62) which is located between piston assembly (34) and piston assembly (38). The stroke transducer (62) measures piston stroke displacement and is utilized to measure system gas leakage. Specifically, if leaks occur in the pressurizing gas system, the charge of the pressurizing gas would progressively be lost and the piston stroke transducer (62) would provide a record of this loss as the piston assembly (34) moves to accommodate the loss of gas. For recording leaks which result directly from gasket failure as opposed to the system as a whole, the recordation device (52) may be attached to a leak detector unit (64) which is linked to annular chamber (46) via passage (48) in sealing assembly (14). In the preferred embodiment, the leak detector unit (64) is a hydrocarbon analyzer, mass spectrometer, or the like linked directly to the annular chamber (46) and the recordation device (52). In an alternative embodiment, the leak space of annular chamber (46) may be sampled manually without utilizing the recordation device (52) through the use of a halogen leak detector, gas chromatograph, or the like. As the gasket fails over the testing cycle, the leak detector will measure an increase in the amount of the pressurized gas that escapes from the chamber (28) to the annular chamber (46) which information, along with the other information which may be provided to the recordation device (52), allows for an analysis as to time before failure for the gasket test sample in the predetermined environment. Gross leaks, beyond the full-scale range of a leak detector unit, may be quantified by stroke transducer (62) data.

It should be apparent from the preceding description that this invention has among other advantages, the advantages of simulating environmental conditions for allowing useful screening of gasket materials whereby data may be gathered which directly relates to in-service performance and the advantage of accelerating the simulation whereby the number of tests and samples may be increased.

While specific embodiments of the invention have been described in detail, it will be appreciated by those skilled in the art that various modifications and alternatives to those details could be developed in light of the overall teachings of the disclosure including, among others, that accelerating the test procedure may be accomplished by increasing the test temperatures, test pressures, cycle rates, or any combinations thereof. Accordingly, the particular arrangements disclosed are meant to be illustrative only and not limiting as to the scope of the invention which is to be given the full breadth of the appended claims and any equivalents thereof. In particular, it is to be understood that the descriptions and drawings shown with respect to the present invention are not limiting and that other load cells, gasket types, pressurizing gases, temperature cycles, and pressure cycles are contemplated.

We claim:

1. A method of approximating service life of a gasket in a predetermined environment, comprising the steps of:
   placing a gasket sample in a test assembly;
   clamping said gasket sample within said test assembly at a predetermined clamping pressure whereby a chamber is formed within the interior of said gasket sample;
   filling said chamber with a pressurized gas from a gas fill system;
   changing the temperature of said gasket sample over a predetermined number of temperature cycles wherein said temperature cycle has a maximum and minimum temperature and a predetermined temperature cycle time period;
   measuring the amount of said gas which leaks from said chamber.

2. The method as recited in claim 1, further comprising the step of changing the pressure of the gas supplied to said chamber over a predetermined number of pressure cycles wherein said pressure cycle has a maximum and minimum pressure and a predetermined pressure cycle time period.

3. The method as recited in claim 2, wherein said temperature cycle time period and said pressure cycle time period are of differing duration.

4. The method as recited in claim 3, wherein said measuring of the amount of leakage of said gas from said chamber is done with a gas chromatograph.

5. The method as recited in claim 3, wherein said measuring of the amount of leakage of said gas from said chamber is done with a hydrocarbon analyzer.

6. The method as recited in claim 3, wherein said measuring of the amount of leakage of said gas from said chamber is done with a mass spectrometer.

7. The method as recited in claim 2, further comprising the step of changing the cycling of the pressure of the gas supplied to said chamber whereby a predetermined pressure is maintained over a predetermined temperature range.

8. The method as recited in claim 7, further comprising the step of pulling a vacuum in said gas fill system and said chamber before filling said chamber with said gas.

9. The method as recited in claim 2, further comprising the step of monitoring said gas fill system for system leaks.

10. The method as recited in claim 9, further comprising the step of recording the pressure of said gas in said chamber, the temperature of said gasket sample, and the amount of leakage of said gas from said chamber.

11. The method as recited in claim 2, wherein the temperature cycle time period is approximately 2 hours.

12. The method as recited in claim 11, wherein the pressure cycle time period is approximately 2 minutes.

13. The method as recited in claim 12, wherein the predetermined number of temperature cycles is approximately 95.

14. An apparatus for approximating service life of a gasket in a predetermined environment, comprising:
   a test assembly adapted to accept a gasket sample;
   clamping means associated with said test assembly for securing said gasket sample within said test assembly and thereby creating a chamber within the interior of said gasket sample;
   filling means connected to said test assembly for filling said chamber with a gas at a predetermined pressure;
   temperature control means associated with said test assembly for changing the temperature of said gasket sample over a predetermined number of temperature cycles wherein said temperature cycle has a maximum and minimum temperature and a predetermined temperature cycle time period; and
   measuring means connected to said test assembly for measuring the amount of said gas which leaks from said chamber.

15. The apparatus as recited in claim 14, further comprising pressure control means associated with said test assembly for changing the pressure of the gas supplied said chamber over a predetermined number of pressure cycles wherein said pressure cycle has a maximum and minimum pressure and a predetermined pressure cycle time period.

16. The apparatus as recited in claim 15, wherein said temperature control means and said pressure control means are both programmable.

17. The apparatus as recited in claim 16, further comprising a recording device attached to said test assembly for allowing the recordation of the amount of said gas which leaks from said chamber.

18. The apparatus as recited in claim 17, wherein said filling means comprises a pressure transducer for sensing the pressure in said chamber and for providing an output indicative of said pressure to said recording device for recordation.

19. The apparatus as recited in claim 18, further comprising at least one thermocouple associated with said test assembly for sensing the temperature of said gasket sample and for providing an output indicative of said temperature to said recording device for recordation.

20. The apparatus as recited in claim 14, wherein said measuring means comprises a gas chromatograph leak detector.

21. The apparatus as recited in claim 14, wherein said measuring means comprises a hydrocarbon analyzer leak detector.

22. The apparatus as recited in claim 14, wherein said measuring means comprises a mass spectrometer leak detector.

23. The apparatus as recited in claim 14, wherein said measuring means comprises a gas piston stroke transducer.

24. The apparatus as recited in claim 14, further comprising load measuring means associated with said test assembly for measuring the changes in load on said gasket sample.

25. The apparatus as recited in claim 15, wherein said temperature control means comprises a heating system, a cooling system, and at least one temperature sensing means for providing feedback to said temperature control means.

26. The apparatus as recited in claim 25, wherein said pressure control means comprises a gas source, a piston assembly, and a pressure sensing means for providing feedback to said pressure control means.

* * * * *